July 25, 1961   R. R. BALAGUER   2,993,977
PORTABLE LIGHTER

Filed Dec. 2, 1959   4 Sheets-Sheet 1

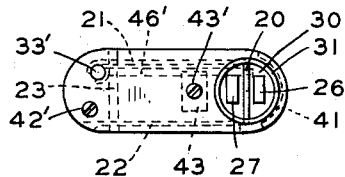
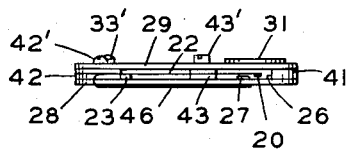
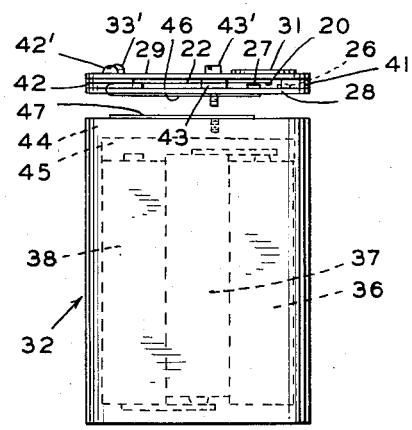
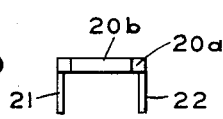
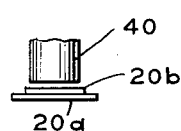
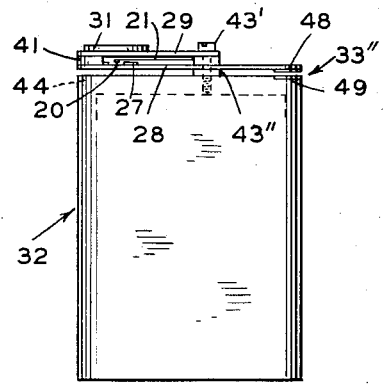
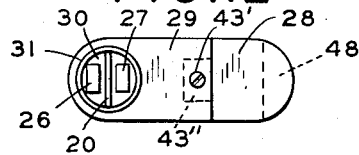
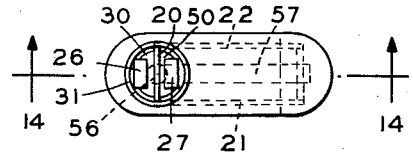
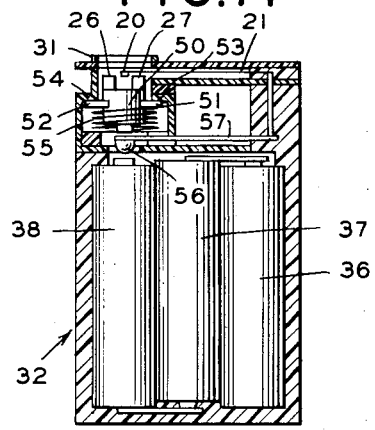
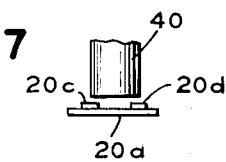

July 25, 1961 R. R. BALAGUER 2,993,977
PORTABLE LIGHTER
Filed Dec. 2, 1959 4 Sheets-Sheet 3

July 25, 1961

R. R. BALAGUER 2,993,977

PORTABLE LIGHTER

Filed Dec. 2, 1959

United States Patent Office 2,993,977
Patented July 25, 1961

2,993,977
PORTABLE LIGHTER
Rodolfo Rodriguez Balaguer, Matanzas, Cuba, assignor to J. D. Hedges and Company Limited Partnership, Matanzas, Cuba, a limited partnership of Cuba
Filed Dec. 2, 1959, Ser. No. 856,711
24 Claims. (Cl. 219—32)

The present invention relates to portable lighters such as may be used for lighting cigars and cigarettes and more particularly to battery operated lighters.

A considerable number of battery operated lighter constructions have heretofore been suggested, but these constructions have contained various defects which have limited their commercial exploitation. Among these defects have been excessive power demand, poor lighting performance both with respect to the quality of the light achieved and an excessive time necessary to achieve a light, excessive cost and short life of the heating element in service.

The principal object of the present invention has been the provision of a novel and improved lighter in which these and other defects are overcome or greatly minimized.

More particularly, it has been an object of the invention to provide a lighter of simple, compact and low cost construction and which exhibits superior lighting characteristics, a minimum energy demand and a long service life.

An important object of the invention has been the provision of a lighter heating element which reaches a high temperature almost instantaneously and which has a minimum heat loss and a minimum energy consumption.

Another object of the invention has been the provision of a lighter heating element which is so constructed as to provide desirable lighting characteristics but which is not readily damaged through careless use.

A further and important object of the invention has been the provision of a lighter heating element in which the portion intended to come into contact with the cigarette is specially constructed to resist damage through such contact.

A feature of the invention has been the provision of a metallic foil heating element and support therefor which exhibits both low thermal inertia and low heat loss characteristics.

Another feature of the invention has been the provision of a heating element which affords a large surface area for contacting the material to be lighted, thereby providing uniform lighting of the cigarette.

Another feature of the invention has been the provision of a heating element which can reach a high temperature almost instantaneously and which requires a minimum consumption of energy to provide a satisfactory light.

Another important object of the invention has been the provision of a portable electrically operated lighter having a thermostatic element arranged to protect the heating element from overheating and to limit current consumption by limiting current flow to the time interval necessary for proper lighting action.

Another object of the invention has been the provision of a lighter of the above type and including a thermostatic element arranged in thermal contact with the cigarette to be lighted and connected so as to cut off current flow in response to lighting of the cigarette.

A feature of the invention has been the provision of a lighter in which the heating current flow may be made intermittent.

Other and further objects, features and advantages of the invention will appear from the following description.

The lighter element of the invention comprises a heating element formed from a very thin electrically conductive metal foil which is very wide relative to its thickness and which can reach a cigarette lighting temperature of the order of bright orange heat almost instantaneously, and a support for the heating element, the support serving to maintain the heating element taut and to dispose the heating element in a position in which its flat surface can be contacted with the material to be lighted, and also to supply electric current to the heating element. The heating element, which is preferably made from platinum, should have a thickness lying within the range of about 0.000010 to 0.000500 inch and preferably has a thickness of about 0.000065 inch. The width of the heating element should lie within the range of about $\frac{1}{128}$ to $\frac{1}{4}$ inch (0.0078125 to .25 inch). The heating element length should be selected so that the heating element will come to a cigarette lighting temperature almost instantaneously with the battery voltage employed. By "almost instantaneously" is meant without noticeable time delay from the standpoint of the user.

A preferred form of lighter construction in accordance with the invention uses a thermostatic element to limit the time during which heating current flows substantially to that time actually necessary for lighting the cigarette. The thermostatic element may operate through heat transfer from the heating element and cigarette, from the heating current, or from both heat transfer and current.

The invention will now be described in greater detail with reference to the appended drawings, in which:

FIG. 8 is a plan view of the lighter element of a modified form of lighter construction in accordance with the invention;

FIG. 9 is a side elevational view of the structure of FIG. 8;

FIG. 10 is a partly exploded side elevational view of the lighter of FIGS. 8 and 9;

FIG. 11 is a side elevational view illustrating a modified form of lighter construction in accordance with the invention;

FIG. 12 is a plan view of the structure shown in FIG. 11;

FIG. 13 is a plan view of a modified lighter construction in accordance with the invention;

FIG. 14 is a cross-sectional view taken along the line 14—14 of FIG. 13;

FIG. 15 is a plan view of a modified form of metal foil heating element in accordance with the invention employing a laminated metal foil construction;

FIG. 16 is a front elevational view of the laminated metal foil of FIG. 15;

FIG. 17 is a view similar to FIG. 16 showing a modification of the metal foil heating element of FIG. 15;

In the various figures of the drawings like reference numerals are employed to designate corresponding elements.

Figures 1, 1A:
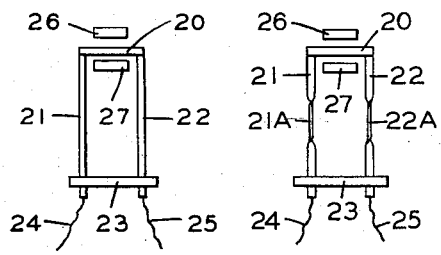
FIG. 1 is a plan view of one form of heating element and support constructed in accordance with the invention.
FIG. 1A is a plan view similar to FIG. 1 and illustrating a preferred form of heating element support construction in accordance with the invention.

Referring now to the drawings and more particularly to FIG. 1, the heating element of the invention comprises a thin electrically conductive metal foil 20. The metal foil 20 is fastened at each end thereof to a respective one of flat, thin spring rods or wires 21 and 22. This fastening may be silver soldering or other suitable means. The spring rods 21 and 22, which may be made of bronze, copper, silver, iron or other suitable electrically conductive metal, are affixed, adjacent their free ends, to an electrically insulating bar 23. The spring rods 21 and 22 provide electrical connections to the ends of the foil 20, and for this purpose the rods 21 and 22 may be provided with connecting wires 24 and 25, respectively. These connecting wires, the spring rods and the other electrical connections should be constructed to have very little electrical resistance relative to the foil 20 so that substantially no power loss occurs therein.

Figure 2:
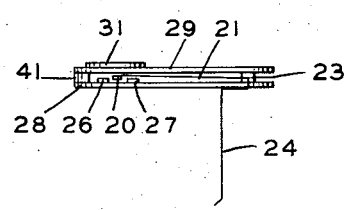
FIG. 2 is a side elevational view of the heating element and support of FIG. 1 assembled with the battery case cover and the lighter cover.

The rods 21 and 22 also serve to position the foil 20 in a substantially flat plane and at a desired height relative to stops 26 and 27 which are positioned adjacent opposite edges of the foil 20. For this purpose, the spring rods 21 and 22 preferably provide a slight longitudinal tension on the foil 20 and are sprung slightly upwards to position the foil 20 slightly above the stops 26 and 27 (as shown in FIG. 2). The stops 26 and 27 are preferably made of glass, baked carbon or a suitable heat resistant ceramic material.

The foil 20 should be constructed so that it will come to a cigarette lighting temperature almost instantaneously upon application of battery potential thereto. A temperature corresponding to a bright orange heat is desirable in order to effect prompt lighting of a cigar or cigarette, e.g., a time of about two seconds or less. If a materially lower temperature is used, lighting will take a long time, e.g., several seconds, unless a very large heating element is used. However, either a long heating time or a large heating element will require an undue energy consumption, which is not tolerable in a portable battery powered lighter. The foil 20 should thus be made from a metal which will withstand a high temperature without melting. So far as is presently known, only platinum is a satisfactory material for the metal foil, although it is possible that other metals or alloys could be used. Platinum, heated to a bright orange heat, will satisfactorily light a cigar or cigarette in a very short time, usually two seconds or less.

In accordance with the invention, the platinum foil should have a thickness lying in the range of about 0.000010 to 0.000500 inch and is preferably about 0.000065 inch thick. A foil having a thickness lying in this range provides a ready flow of heat from the interior of the foil and from the posterior face of the foil to the front or cigarette contacting face. A thinner foil will generally be too weak to withstand the stresses set up, while a thicker foil will exhibit too great a thermal inertia and undue heat loss from the ends for satisfactory operation. The use of a thin foil also permits the use of a relatively wide cigarette contacting surface, which may be between about ¼ inch and $\frac{1}{128}$ inch in width and is preferably about $\frac{3}{128}$ inch wide. A platinum foil having dimensions lying within these ranges can be brought to a suitable high temperature almost instantaneously and with a relatively small energy consumption. A typical energy consumption might be about 0.8 ampere at 3.6 volts for about two seconds, per light. Furthermore, the relatively large cigarette contacting surface will permit the cigarette or cigar to be lighted quickly, thus minimizing the power consumption. Use of a thin foil, as described, also minimizes the energy consumption because the foil mass is very small and its thermal inertia and end heat losses are very small, so that the foil will come to an operating temperature almost instantaneously with a minimum current.

With a thin foil, as described, the distribution of heat throughout the length of the foil will be substantially uniform and the flow of heat into the supporting structure (rods 21 and 22) will be very small. Because the foil employed is so thin, the thermal inertia will be very small so that even with a double thickness intermediate portion, which may be used, substantially even heat distribution will be achieved. The even temperature distribution and the small heat loss from the ends of the foil permit the use of a relatively short heating element, e.g., about ½ inch for a power source of three series connected size "A–A" batteries, while still providing lighting in a band extending completely across the end of the cigarette, including the paper. The ends of the heating elements are of particular importance since it is the ends which light the cigarette paper or cigar wrapper. Lighting of the paper or wrapper effects a rapid lighting of the cigarette or cigar which is much more effective than the lighting of an intermediate area only.

Use of a thin foil, as described, presents another important advantage in the form of automatic temperature regulation. This is due in part to the fact that heat radiation increases with temperature so that, if the foil tends to become too hot (as with a high battery voltage), the increased loss of heat due to increased radiation will tend to lower the temperature. Similarly, decreased radiation when the foil is too cool (as with a low battery voltage) will tend to increase the foil temperature. Another factor which tends to maintain the foil temperature constant is the increase in electrical resistance (particularly in the case of platinum) of the foil with increasing temperature. Both of these factors tend to maintain the foil temperature within a tolerable range despite changes in battery potential with age. Thus a new battery, which will tend to exhibit a high voltage, and an older battery, which will tend to exhibit a lower voltage, will each result in foil heating to a roughly controlled temperature range dependent on the foil design. If a wire were used instead of a thin metal foil, localizing of heat generation would prevent the attainmen of this auto-regulation of temperature so that optimum heat generation could not be attained. Thus if a wire element in the form of a coil or similar configuration were designed to reach the proper temperature at a me dian battery voltage, the wire would overheat at ful voltage and would be too cold at low voltage. The heat ing element of the invention, on the other hand, adjusts its temperature within a permissive range over the life of the battery so as to obtain a high temperature (but without fusing) for new batteries, and a satisfactory temperature when the battery is practically worn out. The auto-regulation characteristic of the foil of the invention permits a maximum utilization of the battery throughout its life.

Figure 3:
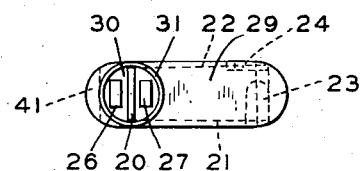
FIG. 3 is a plan view of the structure shown in FIG. 2.

Referring now to FIGS. 2 and 3, the stops 26 and 27 are mounted on a battery case top 28 which may be made of any suitable material, e.g., a molded plastic such as Lucite. It should be made from an electrically insulating material. A lighter top 29, which may similarly be made of Lucite, is mounted directly above and parallel to the battery case top 28. The top 29 is provided with a cigarette (or cigar) admitting and guiding aperture 30 which may be provided with an outwardly extending guide ring 31. As a cigarette (or cigar) is inserted through the aperture 30, the tip thereof contacts the foil 20 and pushes it downwardly against the spring action of the rods 21 and 22. The cigarette tip cannot be inserted beyond the tops of the stops 26 and 27 and so cannot crush the foil 20, the latter being held by the cigarette at a point level with or just below the tops of the stops 26 and 27. If desired, the foil 20 may be positioned initially level with the tops of the stops 26 and 27, but not appreciably below this level since contact between the foil and the cigarette is desired. In this case, little or no motion of the foil will take place. Nevertheless it is important that the foil be spring mounted because cigarette ends are frequently irregular and some penetration below the level of the top of the stops may occur.

Figure 4:
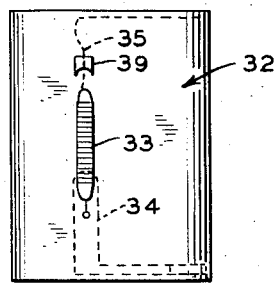
FIG. 4 is a side elevational view of the battery case and switch.
Figure 5:
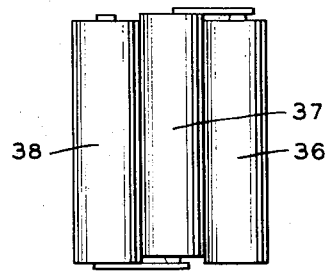
FIG. 5 is a side elevational view of the batteries.
Figure 7:
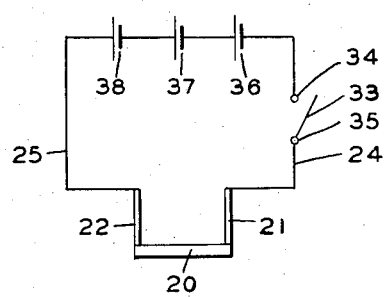
FIG. 7 is a circuit diagram illustrating the electrical connections for the lighter.

The battery case 32, shown in FIG. 4, may be made of plastic or other suitable material and is provided with an externally operable switch element 33 which, when manually pushed upwards, electrically interconnects a contact element 34 and a contact lement 35. The battery case 32 contains the batteries which power the lighter. These may be, as shown in FIG. 5, three size "A–A" dry cells 36, 37 and 38. The contact 35 is connected to the lead 24, as shown in FIG. 7. The contact 34 is connected to the negative terminal of battery 36. The batteries 36, 37 and 38 are connected in series, as shown, so that the combined battery voltage is applied to the heating element 20 when the switch 33 is operated. The battery case may be provided with a projecting stop 39 to limit switch movement.

Figure 6:
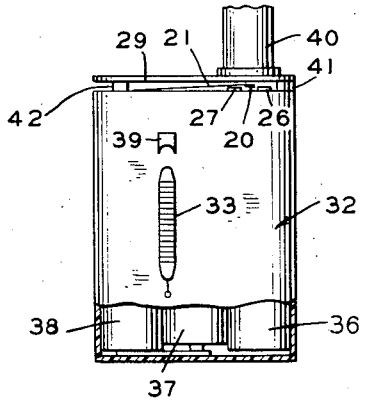
FIG. 6 is a side elevational view of the assembled lighter, with a portion of the battery case broken away to show the batteries.

The assembled lighter is shown in FIG. 6 with a cigarette 40 inserted in the aperture 30. As best shown in FIG. 6, the lighter top 29 and the battery case top 28 may be held in parallel spaced relationship by suitable blocks 41 and 42 which may be cemented or otherwise affixed to the tops. If desired, the top or bottom of the battery case may be removable for replacement of batteries.

In a modified form of construction illustrated in partly exploded form in FIGS. 8, 9 and 10, the switch element 33 is replaced by a push button switch 33' mounted on the top 29 of the battery case 32. Also in this modification, a spacing block 43, located intermediate the spacing blocks 41 and 42, is provided between the tops 28 and 29. A threaded screw 42' acting in a hole provided in the block and extending into a threaded hole provided in the battery case top 28 holds the lighter top 29 in place with respect to the battery case top 28. The battery case 32 may be provided with a liquid proof seal beneath the top 28, as shown at 44, leaving a space 45 between the batteries and the seal 44. In this way, any leakage from the batteries as they age will not penetrate to the outside of the battery case. A screw 43' acting in holes provided in the block 43 and the top 28 extends into a threaded hole in the sealing material 44 to affix the tops 28 and 29 and the heating element to the battery case.

Electrical contact between the rod 22 and one of the battery terminals may be afforded through a metal contact strip 46 carried on the bottom of the member 28 and a corersponding strip 47 carried on the top of the sealing material 44, and through a conductor (not shown) extending through the seal 44 to the interior of the battery case. Electrical contact between the rod 21 and the batteries is effected through similar contact strips (the contact strip 46' being shown in FIG. 8). However, in this case, the switch 33' is interposed between the rod 21 and the strip 46' so that only when this switch is manually operated will the electrical circuit be complete.

In place of the series connected dry cell batteries 36, 37 and 38, any suitable batteries may be employed in any desired number, electrical configuration or mechanical arrangement. For example, where a lighter is intended principally for cigars, a relatively long metal foil heating element will be desirable, e.g., about 1 inch. In such case, five or six series connected dry cells may be used. Where desired, various combinations of series-parallel connected cells may be employed to achieve a desired voltage and battery capacity. Since it is, of course, desirable that the battery voltage remain as constant as possible over the battery life, it is preferred to employ a battery construction of superior life and heavy duty service characteristics, such as the battery shown in my United States Patent No. 2,903,499, issued September 8, 1959. This battery construction provides voltage-life characteristics far superior to those of conventional dry cell batteries. Moreover, the low internal resistance of this type of cell affords a superior voltage regulation, thus aiding in providing a quick light.

In the modified form of construction shown in FIGS. 11 and 12, the battery case top 28 is supported slightly above the battery case by a supporting block 43", and the switch 33' is replaced by a simple switch 33" formed by a contact element 48 provided on the bottom of the element 28 and a contact 49 provided on the case 32. When the right-hand end of the element 28 is pushed downwardly (FIG. 11), the switch 33" is closed and current flows through the metal foil heating element 20.

Another modified form of construction of the lighter of the invention is illustrated in FIGS. 13 and 14. In this construction, the metal foil heating element 20 is spring mounted on spring arms 21 and 22, as described previously, but the stops 26 and 27 are provided on a vertically movable bar 50 which is positioned above the batteries in the battery case. The bar 50 has flanges 51 and 52 the top surfaces of which are arranged to contact inwardly extending flanges 53 and 54, respectively, of the battery case to limit outward (upward) movement of the bar 50. A coil spring 55 acting between the lower surfaces of the flanges 51 and 52 and the top of the battery compartment of the battery case urges the bar upwardly. When a cigarette or a cigar is pressed against the stops 26 and 27, the bar 50 is pushed downwardly against the spring pressure. As the bar 50 descends, it causes a contact element 56 to engage the center contact of battery 38, completing the electrical circuit for the lighter heating element 20. The contact 56 is normally urged upward out of engagement with the battery 38 by a spring arm 57. When the cigarette is removed, the bar 50 moves upwardly, releasing the contact 56. With this arrangement, power consumption for cigarette lighting is not begun until the cigarette is in lighting position, and power consumption stops as soon as the cigarette is removed. This eliminates a potential power loss through unduly long switch operation by the user.

Some improvement in the average life of the heating element of the invention can be achieved by increasing the thickness of an intermediate portion of the metal foil heating element. This increased thickness portion is preferably at least coextensive with the cigarette or cigar contacting part of the metal foil 20. The intermediate portion can be made somewhat longer, but should not extend too close to the ends of the metal foil since this will tend to increase heat loss through the supporting structure. Since the principal advantage of the increased thickness portion is due to the effect of contacting the cigarette paper or cigar wrapper, the increased thickness portion may be divided into two sections each arranged to contact the cigarette paper or cigar wrapper, as the case may be.

As shown in FIGS. 15 and 16, the thin metal foil 20a corresponds to the thin metal foil 20 previously described and may be identical thereto. That portion of the metal foil 20a which is opposite the end of the cigarette 40 is increased in thickness as shown at 20b. The increased thickness 20b can most easily be achieved by laminating a short length of metal foil to the foil 20a by placing the two in contact and passing an electrical current therethrough of sufficient magnitude to fuse the two together, thus providing the intimate electrical and thermal contact needed between the foils 20a and 20b. If the foil 20a is about 0.000065 inch in thickness, as is preferred, the foil 20b may be of the same thickness, giving a total thickness in the cigarette contacting region of the heating element of about 0.00013 inch. It will generally be undesirable for the total thickness of the combined foils 20a and 20b to exceed 0.0005 inch.

As shown in FIG. 17, the increased thickness portion of the heating element may be divided into two sections 20c and 20d, each disposed so as to contact the cigarette paper or cigar wrapper. The sections 20c and 20d can conveniently be laminated to the foil 20a in the same way as the foil 20b, and will be of the same thickness as the foil 20b.

The metal foil heating element of the invention may be folded over on itself along its longitudinal center line. For this purpose, the foil employed should be wider and thinner than desired so as to provide the proper dimensions after folding. For example, if the desired foil heating element is to be 1/32 inch wide and 0.0004 inch thick, the foil before folding would be 1/16 inch wide and 0.0002 inch thick. A folded heating element of this type will generally be found to have a higher tensile and crushing strength than a single thickness foil of the same final dimensions.

As mentioned previously, it is important that the metallic foil heating element be spring-supported for movement in a vertical direction in order to prevent crushing and breakage of the foil on contact with the cigarette. It is also important that the foil be maintained under some longitudinal tension in order to maintain the foil substantially flat as it elongates and shrinks under changing temperatures. The spring support rods 21 and 22 of FIG. 1 may provide both the vertical spring support and the longitudinal tension. The support rods 21 and 22 are preferably formed as thin, flat strips. A suitable construction, for example, might be a silver strip 0.002 inch thick and 1/64 inch wide. As will be seen in FIGS. 1 and 2, the wide surface of the spring supports 21 and 22 is horizontal, i.e., substantially in the plane of the foil cigarette contacting surface.

To insure satisfactory operation over a long life, maintenance of adequate longitudinal tension in the foil heating element is important. In accordance with the invention, a simple but efficient way of providing and maintaining the desired longitudinal tension is to twist one or more intermediate sections of the spring support members by approximately 90°. This construction is illustrated in FIG. 1A in which the sections 21A and 22A of the springs 21 and 22 are twisted 90° so that in these intermediate sections the wide spring surface is substantially vertical. Since spring action will be greatest in a direction normal to the spring width, the horizontal end portions of the springs 21 and 22 will provide the desired resilient vertical support for the foil 20, while the vertical intermediate portions 21A and 22A will provide the desired horizontal spring action, i.e., tension in the foil. To maintain proper tension in the foil 20 over the full range of foil temperature variations, it is only necessary to adjust the sections 21A and 22A to have rest portions in which the ends of the springs will hold the foil flat at the greatest foil length. As the foil tends to shorten (on cooling) the springs 21 and 22 will move toward each other primarily due to springing in the sections 21A and 22A.

Figure 26:
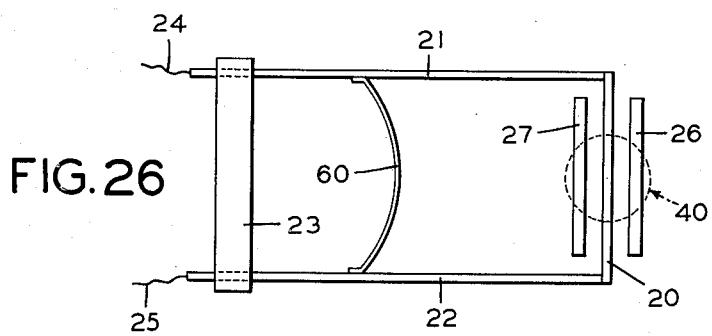
FIG. 26 is a plan view, similar to FIG. 1, illustrating a modified form of heating element and support constructed in accordance with the invention.

Spring action in a horizontal direction to maintain the heating foil 20 under tension can also be secured in other ways, although the construction illustrated in FIG. 1A is preferred. Another such tensioning arrangement is illustrated in FIG. 26 which shows a bowed spring arm 60 disposed between and in contact with the springs 21 and 22. The arm 60, which should be made from an electrically insulating material or otherwise be arranged so as not to carry current, should provide the desired outwardly directed force tending to push the spring arms away from each other, as described above.

Figure 27:
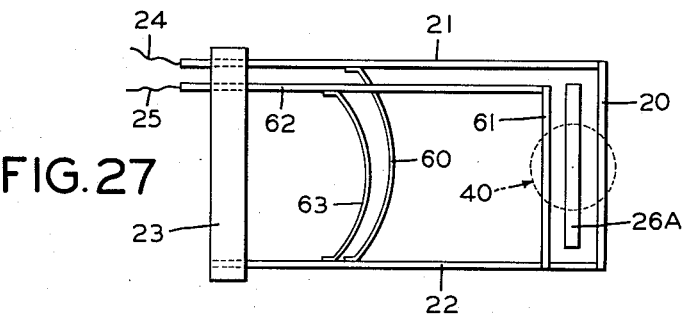
FIG. 27 is a plan view, similar to FIG. 1, illustrating a further modified form of heating element and support construction in accordance with the invention.

If desired, and if appropriate battery voltage is available, two or more metal foil heating elements can be used. One such construction is shown in FIG. 27. In FIG. 27 the springs 21 and 22, the foil 20 and the spring 60 correspond to the construction shown in FIG. 26. However, an additional foil heating element 61 is supported between the spring 22 and an additional spring 62. A bowed spring 63, similar to the bowed spring 60, serves to tension the foil 61. In FIG. 27 the foils 20 and 61 are connected in series through the end of the spring 22, electrical connections 24 and 25 being attached to springs 21 and 62, respectively. The cigarette contacting stop, as shown in FIG. 27, is a single block 26A instead of the two blocks 26 and 27 of FIG. 26. Arrangement of the stop and heating foils with respect to a cigarette is shown by the dotted outline of the cigarette 40.

Figure 28:
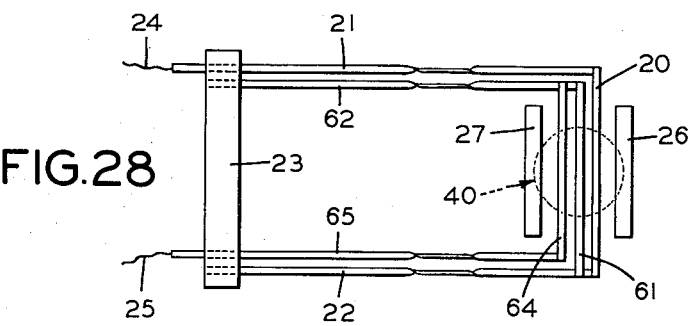
FIG. 28 is a plan view, similar to FIG. 1, illustrating a still further modified form of heating element and support construction in accordance with the invention.

An arrangement of three foils 20, 61 and 64 connected in series is shown in FIG. 28. The extra foil 64 is supported between the spring 62 and an additional spring 65. In this construction, use of the 90° twist intermediate sections of the foil-supporting spring arms (as in FIG. 1A) is shown. If desired, when using plural foil heating arrangements, parallel or series-parallel connections of these elements can be used, depending upon the voltage and battery characteristics.

As shown in FIGS. 27 and 28, the multiple foils are preferably disposed in space parallel to each other. Other geometric arrangements may be used but generally with an undesirable increase in power losses.

Figure 29:
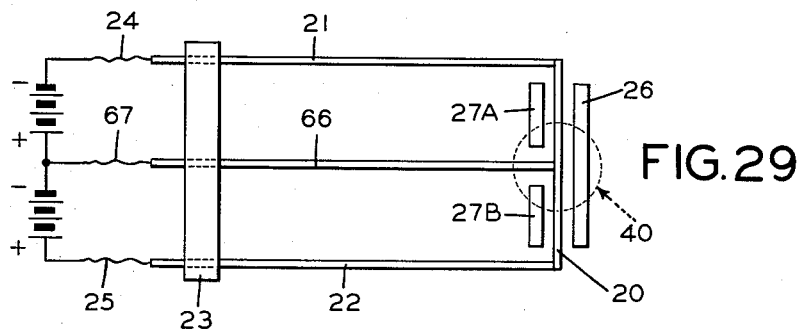
FIG. 29 is a plan view, similar to FIG. 1, illustrating a still further modified form of heating element and support construction in accordance with the invention.

In FIG. 29 the heating element 20 is supported on springs 21 and 22, as described previously, and also on an intermediate similarly constructed spring 66, which may be disposed midway between the springs 21 and 22. The spring 66 affords an electrical contact to the midpoint of the battery power supply, as shown by the conductor 67 attached to the end of the spring 66. Division of the heating element into two parts, as shown in FIG. 29, provides adjustment of the current flow between the two portions to obtain more uniform heating and to prevent one section of the heating element from overheating. The spring 66 may be arranged so as to be disposed at a downward angle with respect to the springs 21 and 22, thus disposing the foil heating element 20 in a shallow V. In this way only the paper of a cigarette will actually touch the foil. Moreover, by proper adjustment of the angle of inclination the foil may be kept under tension as it changes in length due to temperature changes. To accommodate the spring 66, the block 27 should be divided into two longitudinally spaced segments 27A and 27B.

Figure 18:
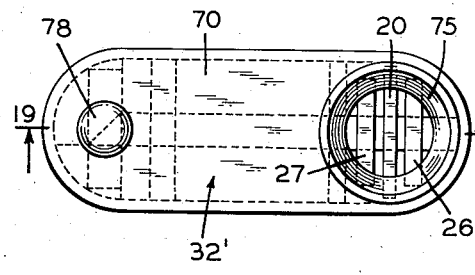
FIG. 18 is a plan view of a preferred form of lighter construction in accordance with the invention.
Figure 21:
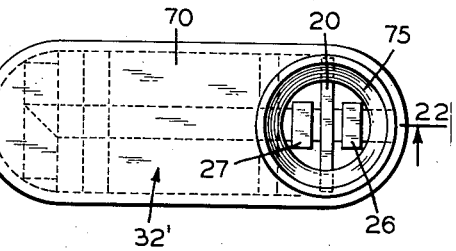
FIG. 21 is a plan view of another preferred form of lighter construction in accordance with the invention.
Figure 19:
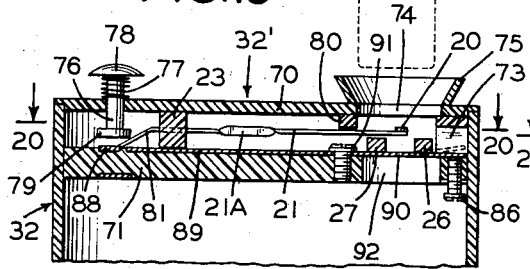
FIG. 19 is a partial longitudinal sectional view taken along the line 19—19 of FIG. 18.
Figure 20:
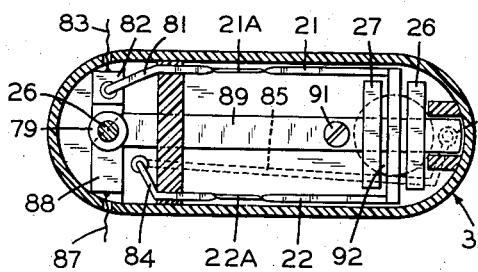
FIG. 20 is a transverse sectional view taken along the line 20—20 of FIG. 19.
Figure 23:
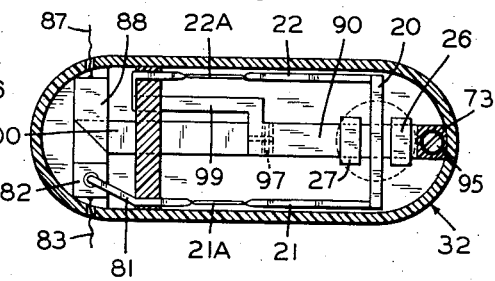
FIG. 23 is a transverse sectional view taken along the line 23—23 of FIG. 22.

Referring now to FIGS. 18, 19 and 20, there is shown a preferred embodiment of the invention. In this form of construction, the battery case 32 is shown as extending the full height of the lighter and the cigarette lighting assembly, here designated 32', is press fit into the open end of the battery case. Preferably, the other end of the battery case (not shown) is openable for removal and insertion of batteries. The battery case may, if desired, be provided with a liquid-tight cover (not shown) above the level of the batteries.

The lighting assembly 32' comprises a top plate 70 and a bottom plate 71 parallel to the top plate 70. A transverse spacing block 23 and an end spacing block 73, both of which may be cemented to the plates 70 and 71, hold the plates 70 and 71 in proper location as an integral assembly.

The top plate 70 is provided with a centrally located aperture 74 adjacent one end thereof adapted to accommodate a cigarette 40. A conical section 75 may be provided as a cigarette guide. The top plate 70 is provided with another aperture adapted to accommodate a rod 76 which is normally urged upwardly by a spring 77 acting between the upper surface of plate 70 and a rod head 78. The rod is provided with a flanged lower end 79 which forms an electrical contact element for the lighter operating switch. The elements 76—79 form a push button switch. The block 23 carries a support structure 21—22 for a foil heating element 20, all of the type shown in FIG. 1A.

Upward travel of the springs 21 and 22 is limited by a spacing block 80 attached to the under surface of the plate 70. Downward motion of the springs 21 and 22 occurs only under the force of a cigarette inserted in the aperture 74, and the downward movement of a cigarette is limited by the blocks 26 and 27. The various portions of the lighter structure likely to come into contact with or be close to a cigarette or the foil 20, and which are not required to carry current or be insulators, e.g., the blocks 26 and 27, may conveniently be made of baked carbon.

The spring 21 is connected by an extension or wire 81 to a conductive strip 82 provided on or embedded in the surface of the plate 71. The strip 82 may be connected by a wire or other conductive means to one terminal of the battery group in the case 32, as indicated schematically by the dotted line 83.

The spring 22 is connected by an extension or wire 84 to a conductive strip 85 embedded in the under surface of the plate 71. The strip 85 is in electrical contact with a contact screw 86 acting in a threaded hole provided in the plate 71.

The other battery terminal is connected by means indicated at 87 to a conductive strip 88 carried on or embedded in the upper surface of the plate 71. The strip 88 is adjacent to but normally insulated from a conductive strip 89 carried on or embedded in the upper surface of the plate 71. When the rod 76 is depressed by the user, the contact element 79 bridges the strips 88 and 89, completing the lighter electrical circuit.

The contact screw 86 is normally in electrical contact with the free end of the under surface of a bimetallic thermostatic element 90. This element might be, for example, 0.005 inch thick and ⅛ inch wide. The element 90 carries affixed to its upper surface the blocks 26 and 27. The thermostatic element 90 is rigidly affixed at its other end to the upper surface of the plate 71 by a screw 91. The thermostatic element 90, over most of its length between the screw 91 and the contact screw 86, extends over a well or aperture 92 in the plate 71. The fixed end of the thermostat 90 is electrically connected to the strip 89, as by silver soldering. The various conductive strips, e.g., 88 and 89, may conveniently be made from gold-plated copper about 0.006 inch thick and about ⅛ inch wide.

When the push button switch formed by contact 79 is operated, the electrical circuit for the metal foil heating element 20 is completed. This circuit extends from one battery group terminal 83 through strip 82, conductor 81, spring 21, metal foil 20, spring 22, conductor 84, strip 85, screw 86, thermostat 90, strip 89, contact element 79 and strip 88 to the other battery group terminal at 87.

As the heating current flows through the thermostat 90, the latter heats up and because of its bimetallic construction tends to pivot upwardly about its rigid connection at screw 91. The thermostat 90 is also heated by radiation from the heating element 20 and from the cigarette, when the latter is lighted. Because of the cooling effect of an unlighted cigarette, relatively little heat will reach the thermostat from the heating element until the cigarette is lighted. At some predetermined temperature of the thermostat 90, which is dependent on the thermostat construction and the vertical position of the screw 86, the bowing action of the thermostat will break the electrical contact between the thermostat and the screw 86, cutting off heating power even though the push button switch is still operated. When the thermostat cools sufficiently, if the switch is still operated, the heating current circuit will be restored and further heating will occur.

It will be evident that by proper thermostat selection and appropriate adjustment of the screw 86 a wide variety of operating conditions can be achieved. For example, the thermostat may be arranged to maintain current flow until the cigarette be lighted and then to cut off the current flow. Again, the thermostat may be arranged to cut the current flow after the current flow has been on for some predetermined time even if the cigarette not be lit. A preferred adjustment of the construction described is for the thermostat to operate, in the absence of a cigarette, to cut off current flow in about two seconds and thereafter to permit current to flow for momentary intervals (a small fraction of a second) about every half second. It has been found that with such an arrangement a cigarette will usually be lighted in less than two seconds, although occasionally a slightly longer time will be needed. But during the interval after the initial current flow, the flow of current will be intermittent. Thus a compromise is achieved between maximum heating effect and minimum current drain.

If desired, the initial current flow period can be reduced, e.g., to ½ second, or increased, e.g., to four seconds. Of course, a longer initial heating period will normally be desired for cigars than for cigarettes. Where the characteristics of the batteries used militate against a long heavy current drain, a short initial current drain and short subsequent flashes will be desirable. But, with the construction illustrated, the short flashes will stop when the cigarette is lit.

If desired, the thermostat 90 may be moved or shielded to be substantially out of heat transfer range from the element 20 so that thermostat operation will be dependent solely on electrical current flow.

The lighter of FIGS. 18–20 can be operated in the absence of a cigarette and hence battery power can be wasted if the push button switch is not promptly released, even though this wastage will be minimized greatly by the action of the thermostat. To prevent accidental operation while in the pocket or purse of the user, the spring 77 should be made relatively strong.

Another preferred embodiment of the invention is illustrated in FIGS. 21–25. In this form of construction, no manually operated switch is provided, lighter operation being initiated by insertion of the cigarette and terminated by withdrawal of the cigarette.

Figure 22:
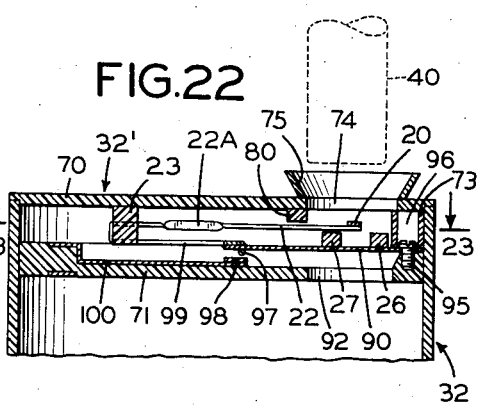
FIG. 22 is a partial longitudinal sectional view taken along the line 22—22 of FIG. 21.

In the construction illustrated in FIGS. 21–25, the lower plate 71 of the lighter assembly 32' is preferably cemented in place in the battery case 32, and thereafter the upper plate 70 is preferably cemented in place above and vertically spaced from the lower plate 71. As best shown in FIG. 22, the lower plate is recessed throughout most of its area to afford space for the operation of the thermostatic switch.

The bi-metallic thermostat 90 is rigidly affixed adjacent one end thereof to the lower plate 71 by a screw 95 acting in a threaded hole provided in the lower plate, the screw 95 extending through a circular opening 96 provided in the spacing block 73. Unlike the thermostat 90 of FIGS.

18-20, the major portions of the thermostat 90 of FIGS. 21-25 does not carry the heating current but operates solely on heat radiated thereto by the foil 20 and the cigarette, when lighted.

A contact bar 97 is affixed to the undersurface of the thermostat 90 adjacent the free end thereof in a position above a contact plate 98. The free end of the thermostat is rigidly affixed to a conductive strip 99 which passes along the under and rear surfaces of the block 23 and is connected to the spring 22. The contact plate 98 is mounted on a metal strip 100 carried on or embedded in the upper surface of the plate 71. In this form of the invention, the strip 100 (corresponding to the strip 89) is in direct and permanent electrical contact with the conductive strip 88.

Figure 24:
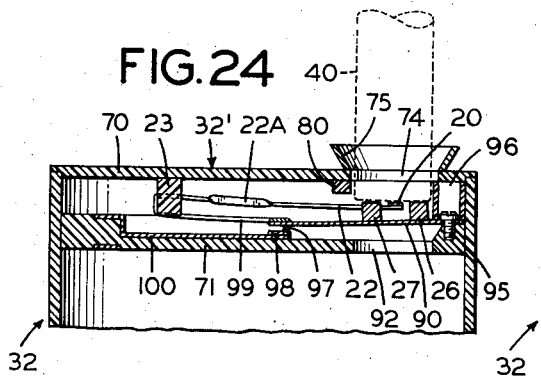
FIG. 24 is a partial sectional view, similar to FIG. 22, showing certain of the lighter elements in a different operating position.

In the absence of a cigarette, the thermostat 90 and the strip 99 assume the horizontal position shown in FIG. 22. When a cigarette is inserted in the aperture 74 through the guide 75, the cigarette contacts the stops 26 and 27 carried on the thermostat 90, pivoting the thermostat downwardly about the edge of the block 73, as shown in FIG. 24. This pivoting action under the force exerted by the cigarette continues until the contact bar 97 meets the contact plate 98. When this contact occurs, a heating circuit is completed, which circuit extends from one battery group terminal (83) through strip 82, conductor 81, spring 21, foil heating element 20, spring 22, conductive strip 99, the free end segment of thermostat 90, contact bar 97, contact plate 98, conductive strip 100 and conductive strip 88 to the other terminal of the battery group (87).

Figure 25:
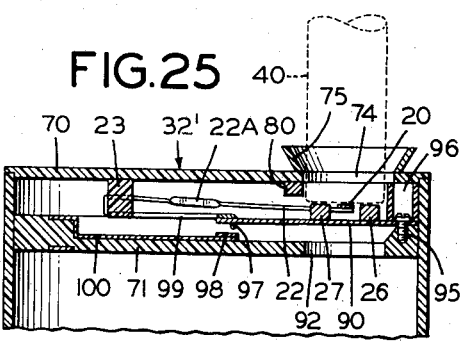
FIG. 25 is a partial sectional view, similar to FIG. 24, showing certain of the lighter elements in a different operating position.

As current flows through foil 20, heat radiated onto thermostat 90 heats the latter. When the cigarette lights, the heat radiated onto the thermostat is greatly increased. Because of its bi-metallic construction, the thermostat 90 will bow (in a direction opposite to that bowing resulting from cigarette pressure) as its temperature rises, and at a predetermined temperature the bar 97 will leave the plate 98, breaking the electrical heating circuit. This condition is illustrated in FIG. 25. If the cigarette is lit, the heat radiated therefrom will maintain the elevated temperature of the thermostat to prevent reclosing of the heating circuit even though the cigarette is not removed. The thermostat may be constructed so as not to break the heating circuit until the cigarette is lit or, if desired, to break the circuit in any event after a predetermined time. In the latter case, if the cigarette is not lit, the thermostat will promptly cool sufficiently to reclose the heating circuit, again passing heating current. Intermittent flashes or surges of current flow will continue until the cigarette is lit. Since the heating element will receive a surge of current before it has cooled substantially, the time required for the thermostat to open the heating circuit after the initial heating period will be shorter than this initial period. As mentioned previously, in the construction of FIGS. 18-20 it is preferred to provide an initial heating interval of about 2 seconds followed by short duration current surges spaced at about one-half second intervals. This may also be effected in the construction of FIGS. 21-25, but since lighting can occur only with a cigarette in place, in this case it is preferable to maintain heating current until the cigarette is lit and to cause the presence of the lighted cigarette to prevent circuit reclosing. However, by appropriate thermostat construction and spacing, the operating characteristics can be varied widely.

It is desirable that the cigarette-operated switch 97—98 be located at a point remote from the aperture 74 so that debris falling from the ends of cigarettes will not interfere with switch operation. Such debris may conveniently fall through the aperture 92 into the upper portion of the space in the battery case under the plate 71.

One advantage of the FIGS. 21-25 construction over that of FIGS. 18-20 is that the lighter will not operate unless a cigarette is inserted, which prevents needless use of the battery power and also affords protection against accidental operation.

While the invention has been described in connection with specific embodiments thereof and in specific uses, various modifications thereof will occur to those skilled in the art without departing from the spirit and scope of the invention as set forth in the appended claims.

What is claimed is:

1. A portable lighter for cigarettes and the like, comprising a battery case adapted to contain battery means including at least one battery cell, an elongated thin metal foil heating element having a substantially flat surface, means carried on said battery case to support said heating element with said flat surface thereof in position to contact cigarettes or the like, stop means carried on said battery case adjacent said heating element and arranged to limit contact of the cigarettes or the like with said heating element thereby to prevent crushing of said heating element, and electrical connections for supplying current from said battery means to said heating element, said electrical connections including a normally open switch which may be closed when operation of said lighter is desired.

2. A portable lighter for cigarettes and the like, comprising a battery case adapted to contain battery means including at least one battery cell, an elongated thin metal foil heating element having a substantially flat surface extending over at least an intermediate portion of said heating element, means carried on said battery case to support said heating element adjacent the ends thereof, said support means including a pair of spring elements affixed to opposite ends of said heating element and arranged to dispose said flat surface thereof in position to contact cigarettes or the like, stop means carried on said battery case adjacent said heating element and arranged to limit contact of the cigarettes or the like with said heating element thereby to prevent crushing of said heating element, and electrical connections for supplying current from said battery means to said heating element, said electrical connections including a normally open switch which may be closed when operation of said lighter is desired.

3. A portable lighter for cigarettes and the like, comprising a battery case adapted to contain battery means including at least one battery cell, an elongated thin metal foil heating element having a substantially flat surface, a pair of spring elements mounted adjacent one end of said battery case and each being connected to a respective end of said heating element, said spring elements providing a spring tension tending to maintain said heating element with its flat surface substantially parallel to and spaced from said one end of said battery case, a pair of stop elements carried on said one end of said battery case and arranged on opposite sides of said flat surface, said stop elements being arranged to contact cigarettes and the like when the latter are placed in lighting contact with said flat surface thereby to limit contact of said cigarettes or the like with said heating element and to prevent crushing of said heating element, and electrical connections for supplying current from said battery means to said heating element, said electrical connections including a normally open switch which may be closed when operation of said lighter is desired.

4. A portable lighter for cigarettes and the like, comprising a battery case adapted to contain battery means including at least one battery cell, an elongated thin metal foil heating element having a substantially flat surface, a pair of spring rods mounted adjacent one end of said battery case and each being connected to a respective end of said heating element, said rods providing a spring tension tending to maintain said heating element with its flat surface substantially parallel to and spaced from said one end of said battery case but being deformable to permit said flat surface to be pushed toward said one end of said case when contacted by a cigarette or the like, a pair of stop elements carried on said one end of said battery case and arranged on opposite sides of said flat surface, said stop elements being arranged to contact cigarettes and the like when the latter have moved said flat surface by a predetermined amount thereby to limit contact of said cigarettes or the like with said heating element and to prevent crushing of said heating element, and electrical connections for supplying current from said battery means to said heating element, said electrical connections including a normally open switch which may be closed when operation of said lighter is desired.

5. A portable lighter for cigarettes and the like, comprising a battery case adapted to contain battery means including at least one battery cell, an elongated thin platinum foil heating element having a substantially flat surface, said foil having a thickness lying in the range of about 0.000010 to 0.000500 inch, means carried on said battery case to support said heating element adjacent the ends thereof, stop means carried on said battery case and arranged to limit contact of the cigarettes or the like with said heating element thereby to prevent crushing of said heating element, and electrical connections for supplying current from said battery means to said heating element, said electrical connections including a normally open switch which may be closed when operation of said lighter is desired.

6. A portable lighter as set forth in claim 5 in which said foil has a width lying in the range of about 1/128 to 1/4 inch.

7. A portable lighter for cigarettes and the like, comprising a battery case adapted to contain battery means including at least one battery cell, an elongated thin metal foil heating element having a substantially flat surface extending over at least an intermediate cigarette contacting portion of said heating element and having a thickness greater than the thickness of the remainder of said heating element, said foil having a thickness lying in the range of about 0.000010 to 0.000500 inch, means carried on said battery case to support said heating element adjacent the ends thereof, stop means carried on said battery case and arranged to limit contact of the cigarettes or the like with said heating element thereby to prevent crushing of said heating element, and electrical connections for supplying current from said battery means to said heating element, said electrical connections including a normally open switch which may be closed when operation of said lighter is desired.

8. A portable lighter for cigarettes and the like, comprising a battery case adapted to contain battery means including at least one battery cell, an elongated thin metal foil heating element having a substantially flat surface, said heating element being formed from a single strip of metal foil folded over upon itself substantially along its longitudinal center line, means carried on said battery case to support said heating element adjacent the ends thereof, stop means carried on said battery case adjacent said heating element and arranged to limit contact of the cigarettes or the like with said heating element thereby to prevent crushing of said heating element, and electrical connections for supplying current from said battery means to said heating element, said electrical connections including a normally open switch which may be closed when operation of said lighter is desired.

9. A portable lighter for cigarettes and the like, comprising a battery case adapted to contain battery means including at least one battery cell, a plurality of elongated thin metal foil heating elements each having a substantially flat surface, spring means carried on said battery case to support said heating elements with said flat surfaces thereof in position to contact at least the paper or wrapper of cigarettes or the like, stop means carried on said battery case adjacent said heating elements and arranged to limit contact of the cigarettes or the like with said heating elements thereby to prevent crushing of said heating elements, and electrical connections for supplying current from said battery means to said heating elements, said electrical connections including a normally open switch which may be closed when operation of said lighter is desired.

10. A portable lighter for cigarettes and the like, comprising a battery case adapted to contain battery means including at least one battery cell, an elongated thin metal foil heating element having a substantially flat surface, support means carried on said case for maintaining said heating element under tension and with its flat surface generally parallel to and spaced from the adjacent surface of said case, movable stop means carried on said case and having a surface spring-urged to a position above the plane of said heating element and adjacent to said flat surface for protecting the latter, said stop means being movable by contact with a cigarette or the like to a position in which the end of the cigarette or the like and said heating element lie in a substantially common plane, and electrical connections for supplying current from said battery means to said heating element, said electrical connections including a normally open switch which may be closed by contact of said movable stop means when operation of said lighter is desired.

11. A heating element for a portable battery operated lighter for cigarettes and the like, comprising a thin conductive metal foil having a thickness lying in the range of about 0.000010 to 0.000500 inch, a width lying in the range of about 1/128 to 1/4 inch, and a length selected with respect to the battery voltage so that said foil will come substantially instantaneously to cigarette lighting temperature when current from said battery is passed therethrough, and means to support said foil with the wide surface thereof disposed substantially flat and in position to contact the end of a cigarette or the like.

12. A heating element for a portable batterry operated lighter for cigarettes and the like, comprising a thin platinum foil having a thickness lying in the range of about 0.000010 to 0.000500 inch and a length selected with respect to the battery voltage so that said foil will come substantially instantaneously to cigarette lighting temperature when current from said battery is passed therethrough, said foil having an intermediate region of greater thickness than the remainder of said foil, said intermediate region being arranged so as to contact physically at least the paper or wrapper of the cigarettes and the like, and spring means to support said foil with the wide surface thereof disposed substantially flat and in position so that the intermediate region thereof will contact the end of a cigarette or the like.

13. A lighting element for a portable battery operated lighter for cigarettes and the like, comprising a thin platinum foil having a thickness lying in the range of about 0.000010 to 0.000500 inch, a width lying in the range of about 1/128 to 1/4 inch, and a length selected with respect to the battery voltage and heat loss so that said foil will come to cigarette lighting temperature substantially instantaneously when current from said battery is passed therethrough, means to support said foil under longitudinal tension and with the wide surface thereof disposed substantially flat and in position to contact the end of a cigarette or the like, and stop means disposed adjacent said foil and arranged to limit contact of said cigarette or the like with said foil thereby to prevent crushing of said foil.

14. A portable lighter for cigarettes and the like, comprising a battery case adapted to contain battery means including at least one battery cell, an elongated thin metal foil heating element having a substantially flat surface extending over at least an intermediate portion of said heating element, means carried on said battery case to support said heating element adjacent the ends thereof, said support means including a pair of spring elements affixed to opposite ends of said heating element and arranged to dispose said flat surface thereof in position to contact cigarettes or the like, stop means disposed adjacent said heating element and arranged to limit contact of the cigarettes or the like with said heating element thereby to prevent crushing of said heating element, electrical connections forming an electrical circuit for supplying current from said battery means to said heating element, said electrical connections including a normally open switch which may be closed when operation of said lighter is desired, and a bi-metallic thermostatic element arranged so that its temperature increases during the period of current flow to said heating element, said thermostatic element being operatively associated with said circuit for opening said circuit when the temperature of said thermostatic element reaches a predetermined temperature.

15. A portable lighter as set forth in claim 14 in which said thermostatic element is disposed adjacent to said heating element whereby heat radiated from said heating element and from a lighted cigarette or the like in contact with said heating element raises the temperature of said thermostatic element.

16. A portable lighter as set forth in claim 14 in which the electrical current supplied to the heating element passes through at least a portion of the thermostatic element causing said thermostatic element to be at least partially heated by the passage of current therethrough.

17. A portable lighter for cigarettes and the like, comprising a battery case adapted to contain battery means including at least one battery cell, an elongated thin metal foil heating element having a substantially flat surface, means carried on said battery case to support said heating element adjacent the ends thereof and to dispose said flat surface in position to contact cigarettes or the like, stop means disposed adjacent said heating element and having a surface arranged to contact cigarettes and the like as the same are brought into lighting contact with said heating element thereby to limit contact of the cigarettes or the like with said heating element and to prevent crushing of said heating element, series electrical connections for supplying current from said battery means to said heating element, said electrical connections including a normally open switch which may be closed when operation of said lighter is desired, a bi-metallic thermostatic element fixed at one end and free at the other end thereof and a normally closed switch, said normally closed switch including the free end of said thermostatic element whereby said normally closed switch will open when said thermostatic element reaches a predetermined temperature, said predetermined temperature being selected to correspond to initial heating current flow through said heating element for a selected time interval.

18. A portable lighter as set forth in claim 17 in which said selected time interval lies between about one-half and four seconds and in which said thermostatic element is arranged to cool and reclose said normally closed switch intermittently for intervals of a fraction of a second until the cigarette is lighted.

19. A portable lighter as set forth in claim 18 in which said stop means is carried on said thermostatic element.

20. A portable lighter for cigarettes and the like, comprising a battery case adapted to contain battery means including at least one battery cell, a top member mounted on said case adjacent the upper end thereof and having an aperture therein adapted to accommodate a cigarette or the like, an intermediate member mounted on said case beneath and vertically spaced from said top member, a support member mounted between said top and intermediate members, a pair of parallel laterally spaced spring arms attached to and cantilevered from said support member, an elongated thin metal foil heating element having a substantially flat surface and being mechanically attached and electrically connected adjacent opposite ends thereof to said respective spring arms, said spring arms being deflectable in a downward direction and being arranged to maintain said heating element under tension, said flat surface of said heating element being disposed beneath said aperture whereby a cigarette inserted through said aperture will contact said flat surface and deflect said arms downwardly, stop means arranged to contact said cigarette and limit said downward deflection of said spring arms, and an electrical circuit for supplying battery power to said heating element, said electrical circuit including in series connection said heating element, said spring arms, a normally open switch and at least a portion of a bi-metallic thermostatic element arranged to be heated when current flows through said heating element.

21. A portable lighter for cigarettes and the like, comprising a battery case adapted to contain battery means including at least one battery cell, a top member mounted on said case adjacent the upper end thereof and having an aperture therein adapted to accommodate a cigarette or the like, an intermediate member mounted on said case beneath and vertically spaced from said top member, a support member mounted between said top and intermediate members, a pair of parallel laterally spaced spring arms attached to and cantilevered from said support member, an elongated thin metal foil heating element having a substantially flat surface and being mechanically attached and electrically connected adjacent opposite ends thereof to said respective spring arms, said spring arms being deflectable in a downward direction and being arranged to maintain said heating element under tension, said flat surface of said heating element being disposed beneath said aperture whereby a cigarette inserted through said aperture will contact said flat surface and deflect said arms downwardly, stop means arranged to contact said cigarette and limit said downward deflection of said spring arms, and an electrical circuit for supplying battery power to said heating element, said electrical circuit including in series connection said heating element, said spring arms, a normally open manually closable switch, a bi-metallic thermostatic element having a fixed end and a free end and an adjustable member arranged to contact said thermostatic element adjacent said free end thereof for opening said electrical circuit when the temperature of said thermostatic element exceeds a predetermined value.

22. A portable lighter for cigarettes and the like, comprising a battery case adapted to contain battery means including at least one battery cell, a top member mounted on said case adjacent the upper end thereof and having an aperture therein adapted to accommodate a cigarette or the like, an intermediate member mounted on said case beneath and vertically spaced from said top member, a support member mounted between said top and intermediate members, a pair of parallel laterally spaced spring arms attached to and cantilevered from said support member, an elongated thin metal foil heating element having a substantially flat surface and being mechanically attached and electrically connected adjacent opposite ends thereof to said respective spring arms, said spring arms being deflectable in a downward direction and being arranged to maintain said heating element under tension, said flat surface of said heating element being disposed beneath said aperture whereby a cigarette inserted through said aperture will contact said flat surface and deflect said arms downwardly, stop means arranged to contact said cigarette and limit said downward deflection of said spring arms, an elongated bi-metallic thermostatic element disposed adjacent said heating element and partially beneath said aperture, said thermostatic element having one end fixed and the other end free for limited vertical movement, a contact element affixed to said thermostatic element adjacent said free end thereof, and an electrical circuit for supplying battery power to said heating element, said electrical circuit including in series connection said heating element, said spring arms, at least a small portion of said thermostatic element adjacent said contact element, said contact element and contact member, said contact member being disposed adjacent to but normally spaced from said contact element whereby said contact element and said contact member form a normally open switch, said thermostatic element being arranged so that a cigarette inserted through said aperture pivots said thermostatic element causing said normally open switch to be closed, motion of said thermostatic element as the temperature of the same exceeds a predetermined value opening said switch despite presence of a cigarette in said aperture.

23. A heating element for a portable battery operated lighter for cigarettes and the like, comprising a thin metal foil having a flat surface and dimensions selected so that said foil will come to cigarette lighting temperature substantially instantaneously when battery current is passed therethrough, and a support for said foil comprising a pair of parallel spring arms each rigidly affixed to said lighter adjacent one end thereof and electrically and mechanically connected to said foil adjacent a respective end of said foil, each of said spring arms being made from a thin, flat strip of electrically conductive spring metal and having a wide dimension substantially in the plane of said flat surface of said foil except for an intermediate section in which said wide dimension is substantially in a plane normal to the plane of said flat surface of said foil.

24. A heating element for a portable battery operated lighter for cigarettes and the like, comprising a thin metal foil having a flat surface and dimensions selected so that said foil will come to cigarette lighting temperature substantially instantaneously when battery current is passed therethrough, and a support for said foil comprising a pair of parallel spring arms each rigidly affixed to said lighter adjacent one end thereof and electrically and mechanically connected to said foil adjacent a respective end of said foil, each of said spring arms being made from a thin, flat strip of electrically conductive spring metal and having a twisted section in which the wide dimension is disposed at substantially 90° to the wide dimension in the remainder of said spring arm.

References Cited in the file of this patent

UNITED STATES PATENTS

| | | |
|---|---|---|
| 1,064,358 | Mettler | June 10, 1913 |
| 1,849,795 | Fenton | Mar. 15, 1932 |
| 2,052,016 | Davis | Aug. 25, 1936 |
| 2,240,678 | Stanard | May 6, 1941 |
| 2,263,350 | Challet | Nov. 18, 1941 |
| 2,301,775 | Goettie | Nov. 10, 1942 |
| 2,744,569 | Hoff | May 8, 1956 |
| 2,844,698 | Costanzo | July 22, 1958 |